United States Patent [19]

Uematsu

[11] Patent Number: 4,743,127
[45] Date of Patent: May 10, 1988

[54] DEVICE FOR DISTRIBUTIVE DOT PRINTING FOR PRINTER

[75] Inventor: Masaru Uematsu, Kawasaki, Japan

[73] Assignee: Fujitsu Limited, Kanagawa, Japan

[21] Appl. No.: 86,252

[22] Filed: Aug. 14, 1987

Related U.S. Application Data

[63] Continuation of Ser. No. 813,442, Dec. 26, 1985, abandoned.

[30] Foreign Application Priority Data

Dec. 28, 1984 [JP] Japan ................... 59-276348

[51] Int. Cl.$^4$ ............... B41J 29/38; B41J 3/12
[52] U.S. Cl. ..................... 400/54; 400/124
[58] Field of Search ............ 400/54, 74, 121, 124, 400/719; 101/93.05

[56] References Cited

U.S. PATENT DOCUMENTS 4,360,819 11/1982 Saito ................... 400/120 X

FOREIGN PATENT DOCUMENTS 124684 9/1980 Japan ................... 400/124
71174 4/1983 Japan ................... 400/124

OTHER PUBLICATIONS

*IBM Tech Disc. Bulletin*, by B. R. Cavill, vol. 24, No. 11A, Apr. 1982, pp. 5430–5432.

Primary Examiner—Paul T. Sewell
Attorney, Agent, or Firm—Armstrong, Nikaido, Marmelstein & Kubovcik

[57] ABSTRACT

A device for distributive dot printing for a printer including a print medium on which printing by printing head is carried out, a printing head having a plurality of head pins arranged in the vertical direction, a carriage carrying the printing head for transporting the printing head in the horizontal direction, and a carriage transportation control unit for causing the printing head to carry out a plurality of printing actions for each row of the head pins. The distributive dot printing is controlled by a head pin selection unit for selecting predetermined head pins from one row of the head pins in each printing action to cause the printing head to perform distributive dot printing.

5 Claims, 12 Drawing Sheets

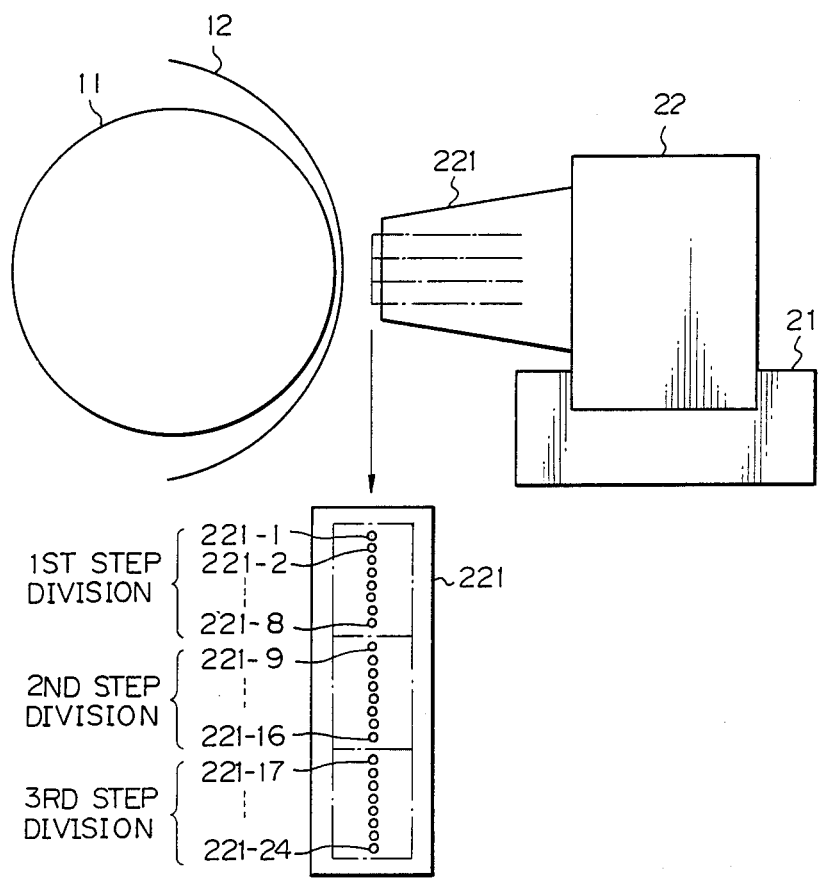

Fig. 3

| 1ST STEP OF DIVISIONAL PRINTING | 2ND STEP OF DIVISIONAL PRINTING | 3RD STEP OF DIVISIONAL PRINTING |
|---|---|---|
| 1 ● ● ● ● ● --- | 1 ○ ○ ○ ○ ○ --- | 1 ○ ○ ○ ○ ○ --- |
| 2 ● ● ● ● ● | 2 ○ ○ ○ ○ ○ | 2 ○ ○ ○ ○ ○ |
| 3 ● ● ● ● ● | 3 ○ ○ ○ ○ ○ | 3 ○ ○ ○ ○ ○ |
| 4 ● ● ● ● ● | 4 ○ ○ ○ ○ ○ | 4 ○ ○ ○ ○ ○ |
| 5 ● ● ● ● ● | 5 ○ ○ ○ ○ ○ | 5 ○ ○ ○ ○ ○ |
| 6 ● ● ● ● ● | 6 ○ ○ ○ ○ ○ | 6 ○ ○ ○ ○ ○ |
| 7 ● ● ● ● ● | 7 ○ ○ ○ ○ ○ | 7 ○ ○ ○ ○ ○ |
| 8 ● ● ● ● ● | 8 ○ ○ ○ ○ ○ | 8 ○ ○ ○ ○ ○ |
| 9 | 9 ● ● ● ● ● --- | 9 ○ ○ ○ ○ ○ --- |
| 10 | 10 ● ● ● ● ● | 10 ○ ○ ○ ○ ○ |
| 11 | 11 ● ● ● ● ● | 11 ○ ○ ○ ○ ○ |
| 12 | 12 ● ● ● ● ● | 12 ○ ○ ○ ○ ○ |
| 13 | 13 ● ● ● ● ● | 13 ○ ○ ○ ○ ○ |
| 14 | 14 ● ● ● ● ● | 14 ○ ○ ○ ○ ○ |
| 15 | 15 ● ● ● ● ● | 15 ○ ○ ○ ○ ○ |
| 16 | 16 ● ● ● ● ● | 16 ○ ○ ○ ○ ○ |
| 17 | 17 | 17 ● ● ● ● ● --- |
| 18 | 18 | 18 ● ● ● ● ● |
| 19 | 19 | 19 ● ● ● ● ● |
| 20 | 20 | 20 ● ● ● ● ● |
| 21 | 21 | 21 ● ● ● ● ● |
| 22 | 22 | 22 ● ● ● ● ● |
| 23 | 23 | 23 ● ● ● ● ● |
| 24 | 24 | 24 ● ● ● ● ● |

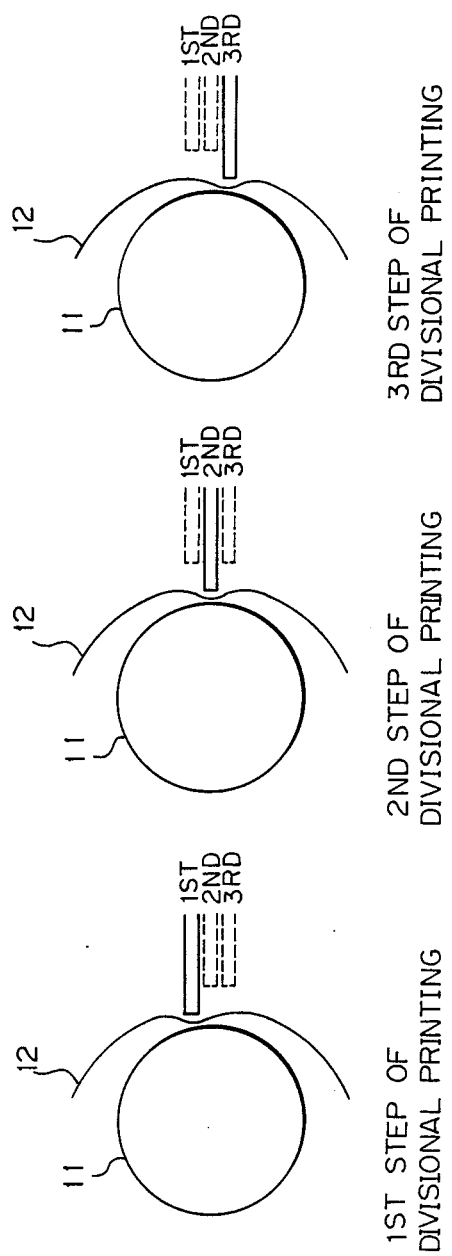

1ST DIVISIONAL PATTERN

2ND DIVISIONAL PATTERN

3RD DIVISIONAL PATTERN

1ST DIVISIONAL PATTERN

2ND DIVISIONAL PATTERN

3RD DIVISIONAL PATTERN

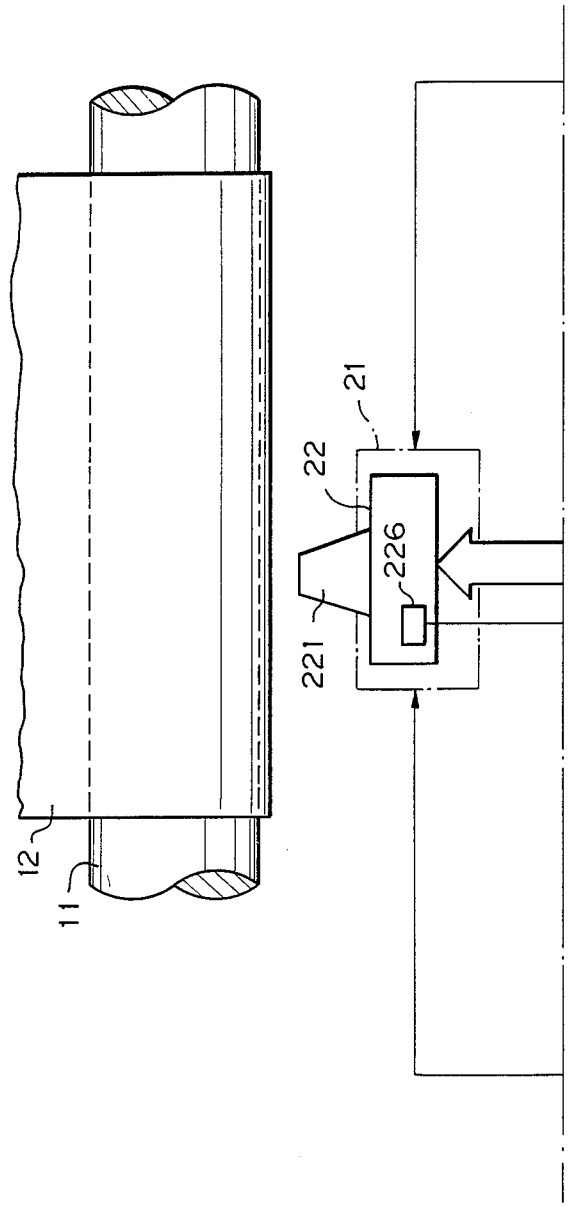

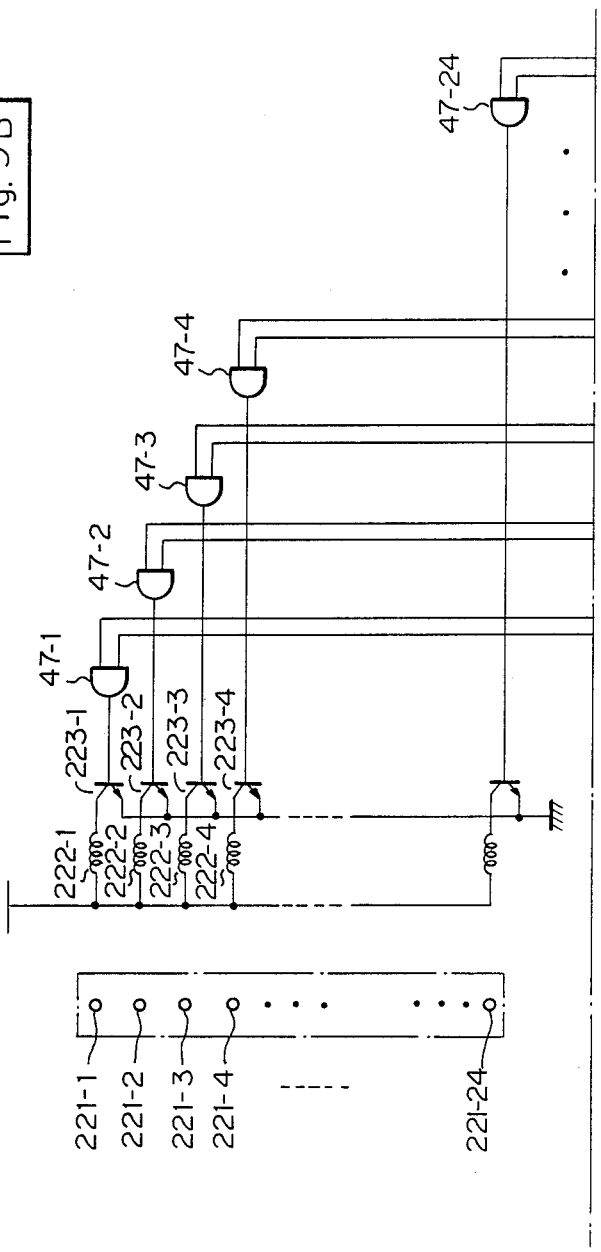

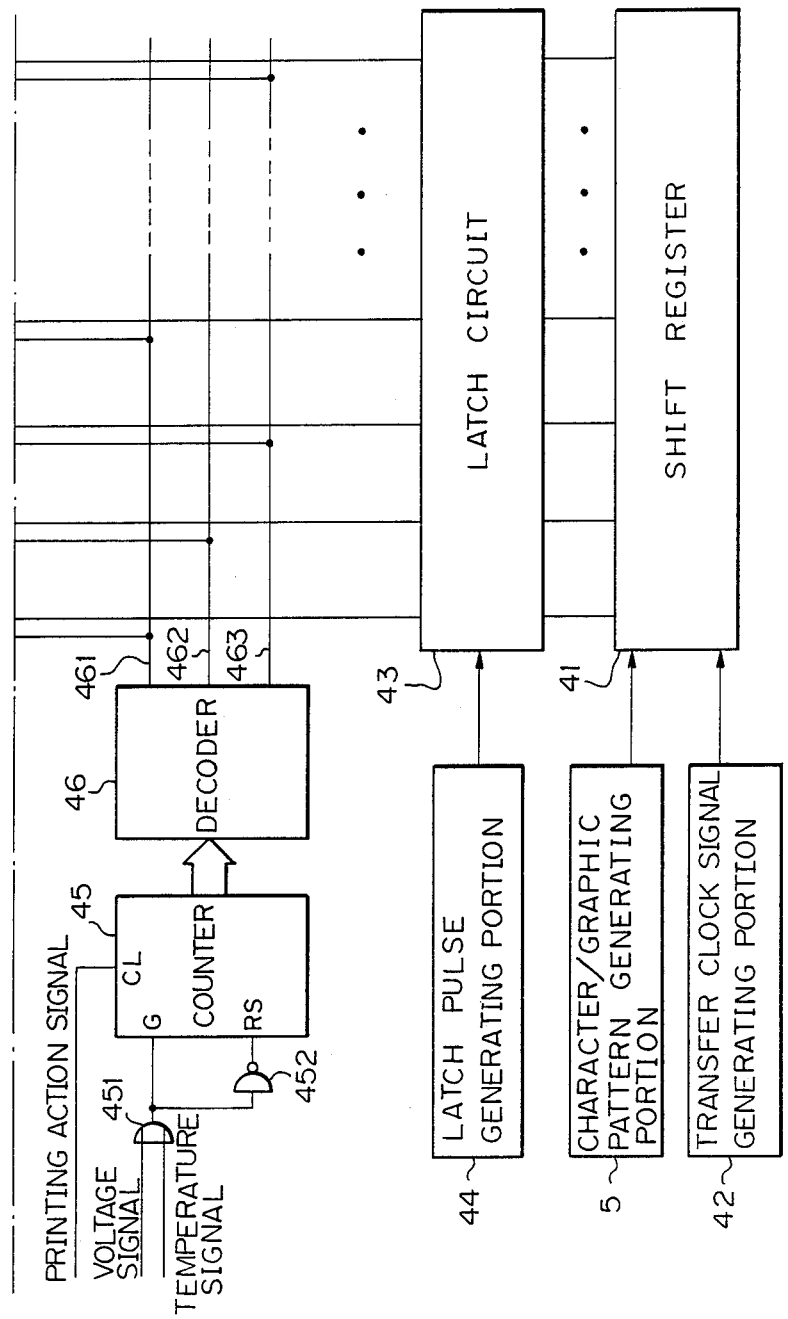

Fig. 10

| 1ST DISTRIBUTIVE STEP OF PRINTING | 2ND DISTRIBUTIVE STEP OF PRINTING | 3RD DISTRIBUTIVE STEP OF PRINTING |
|---|---|---|
| 1 ● ● ● ● ● --- | 1 o o o o o --- | 1 o o o o o --- |
| 2 | 2 ● ● ● ● ● --- | 2 o o o o o --- |
| 3 | 3 | 3 ● ● ● ● ● --- |
| 4 ● ● ● ● ● | 4 o o o o o | 4 o o o o o |
| 5 | 5 ● ● ● ● ● | 5 o o o o o |
| 6 | 6 | 6 ● ● ● ● ● |
| 7 ● ● ● ● ● | 7 o o o o o | 7 o o o o o |
| 8 | 8 ● ● ● ● ● | 8 o o o o o |
| 9 | 9 | 9 ● ● ● ● ● |
| 10 ● ● ● ● ● | 10 o o o o o | 10 o o o o o |
| 11 | 11 ● ● ● ● ● | 11 o o o o o |
| 12 | 12 | 12 ● ● ● ● ● |
| 13 ● ● ● ● ● | 13 o o o o o | 13 o o o o o |
| 14 | 14 ● ● ● ● ● | 14 o o o o o |
| 15 | 15 | 15 ● ● ● ● ● |
| 16 ● ● ● ● ● | 16 o o o o o | 16 o o o o o |
| 17 | 17 ● ● ● ● ● | 17 o o o o o |
| 18 | 18 | 18 ● ● ● ● ● |
| 19 ● ● ● ● ● | 19 o o o o o | 19 o o o o o |
| 20 | 20 ● ● ● ● ● | 20 o o o o o |
| 21 | 21 | 21 ● ● ● ● ● |
| 22 ● ● ● ● ● | 22 o o o o o | 22 o o o o o |
| 23 | 23 ● ● ● ● ● | 23 o o o o o |
| 24 | 24 | 24 ● ● ● ● ● |

1ST DISTRIBUTIVE STEP OF PRINTING

2ND DISTRIBUTIVE STEP OF PRINTING

3RD DISTRIBUTIVE STEP OF PRINTING

DEVICE FOR DISTRIBUTIVE DOT PRINTING FOR PRINTER

This is a continuation of application Ser. No. 813,442, filed Dec. 26, 1985 and now abandoned.

BACKGROUND OF THE INVENTION

1. Field of the Invention

The present invention relates to a device for distributive dot printing for a printer. The device according to the present invention can be used for a serial printer of the wire dot type.

2. Description of the Related Arts

In general, an electromagnetic coil is used for actuaitng the head pins or dot wires of a printing head. The electromagnetic coil is energized from a power source.

When a graphic pattern such as a broad solid line pattern is printed, approximately the maximum capacity of the power source is needed for the printing. On the other hand, when a character or numeral pattern is printed, only approximately 20% in average and approximately 33% at maximum of the maximum capacity of the power source is needed for the printing.

Under these conditions, it is not economical to provide a power source having a capacity corresponding to that require for the printing of an entire block pattern. Accordingly, the design capcity of the power source for such a printer is usually approximately 33% of the maximum value required.

If the design capacity of the power source is approximately 33% of the maximum value as described above, the source voltage for the energization of the printing head for carrying out printing of a graphic pattern will sometimes fall below the necessary voltage and the graphic pattern cannot be printed. To counter such a situation, the method of divisional printing has been used for cases where the source voltage is insufficient.

In the divisional printing method, the head pins in the printing head are divided into two or three groups and the groups individually energized. A dot pattern in one row is thus printed divisionally, for example, in two steps or in three steps. For two-step divisional printing, the design capacity of the power source can be made approximately 50% of the maximum value. For three-step divisional printing, the design capacity of the power source can be made approximately 33% of maximum value.

When the above-described divisional printing is applied to the paper on the platen, during the plural steps of divisional printing, the printing device does not feed the paper forward. However, as with all continuous feed systems, the paper is not in a state of tension against the platen and is only loosely held.

In applying the plural steps of the divisional printing to paper in such a state, the paper unavoidably shifts in position. That is, the paper shifts in position in the course of the process of, for example, a first step, a second step, and a third step of the divisional printing.

Because of this shift in position of the paper, the plural patterns printed by divisional printing using a printing head sometimes are interspaced by gaps or partially overlap each other.

Such gaps or overlapping detracts from the quality of the print, and causes considerable problems in realizing satisfactory quality of the printed product.

An example of the prior art divisional printing system is disclosed in Japanese Unexamined Patent Publication (Kokai) No. 58-71174.

SUMMARY OF THE INVENTION

The object of the present invention is to provide an improved device for dot printing for a printer in which the undesirable effect caused by the shift in position of a paper to be printed is minimized, distributive printing of the head pins in a printing head is carried out, gaps or overlapping is prevented, and the quality of the printed product is enhanced.

According to the present invention, there is provided a device for distributive dot printing for a printer including: a print medium on which printing by a printing head is carried out; a printing head having a plurality of head pins arranged in the vertical direction; a carriage carrying the printing head for transporting the printing head in the horizontal direction; a carriage transportation control unit for causing the printing head to carry out a plurality of printing actions for each row of the head pins; and a head pin selection unit for selecting predetermined head pins from one row of the head pins in each printing action to cause the printing head to carry out distributive dot printing.

BRIEF DESCRIPTION OF THE DRAWINGS

In the drawings,

FIG. 3 shows a pattern of dots printed by the prior art divisional dot printing device for FIG. 1;

FIGS. 8, 8A and 8B show a device for distributive dot printing for a printer according to an embodiment of the present invention;

FIGS. 9, 9A and 9B show the electrical circuits used in the device of FIG. 8;

FIG. 10 shows a pattern of dots printed by the device of FIG. 8; and

DESCRIPTION OF THE PREFERRED EMBODIMENTS

Before entering into the detailed description of the preferred embodiments, a prior art divisional dot printing device and the operation thereof are described with reference to FIGS. 1 to 7. In the general view of a divisional dot printing device of FIG. 1, the printing by a printing head 22 mounted on a carriage 21 is applied to a paper 12 on a platen 11.

Figure 2:
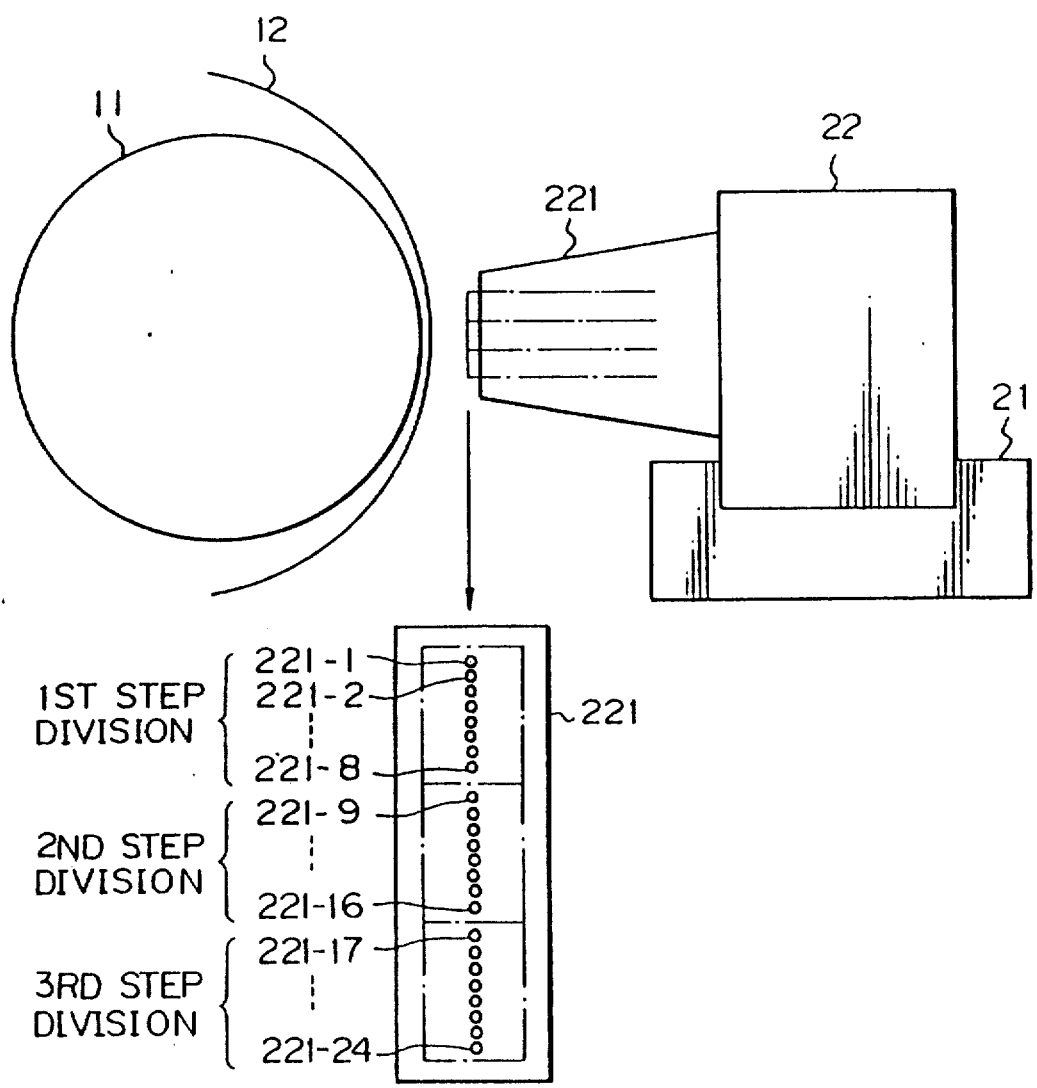
FIG. 2 is a cross-sectional view of the arrangement of the head pins for the wire dot printing used for the prior art divisional dot printing device of FIG. 1 along line II—II.

The head pins (dot wires) 221-1, 221-2, . . . 221-24 are arranged in one row in the vertical direction in the printing head as shown in FIG. 2. The upper ⅓ head pins 221-1, 221-2, . . . 221-8 constitutie the first step division of the head pins. The middle ⅓ head pins 221-9, 221-10, ... 221-16 constitute the second step division of the head pins. The lower ⅓ head pins 221-17, 221-18, ... 221-24 constitute the third step division of the head pins.

The pattern of dots printed according to the divisional printing by the device of FIG. 2 is illustrated in FIG. 3. In the first step of the divisional printing, dots are printed by the 1st to 8th head pins. In the second step of the divisional printing, dots are printed by the 9th to 16th head pins. In the third step of the divisional printing, dots are printed by the 17th to 24th head pins. In FIG. 3, dots printed in the divisional step in question are indicated by black circles, while dots printed in the preceding step or steps are indicated by white circles.

Figure 4:
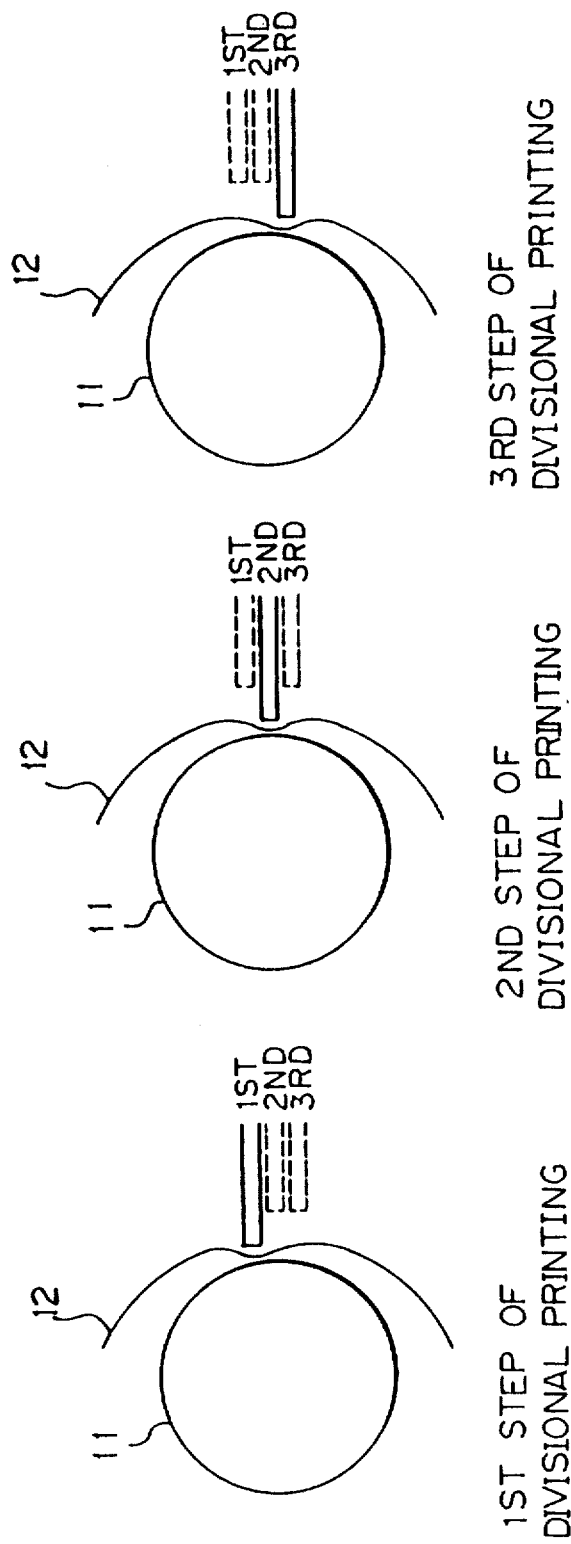
FIG. 4 illustrates the behavior of the paper and the printing head in the prior art divisional dot printing device of FIG. 1.
Figure 5:
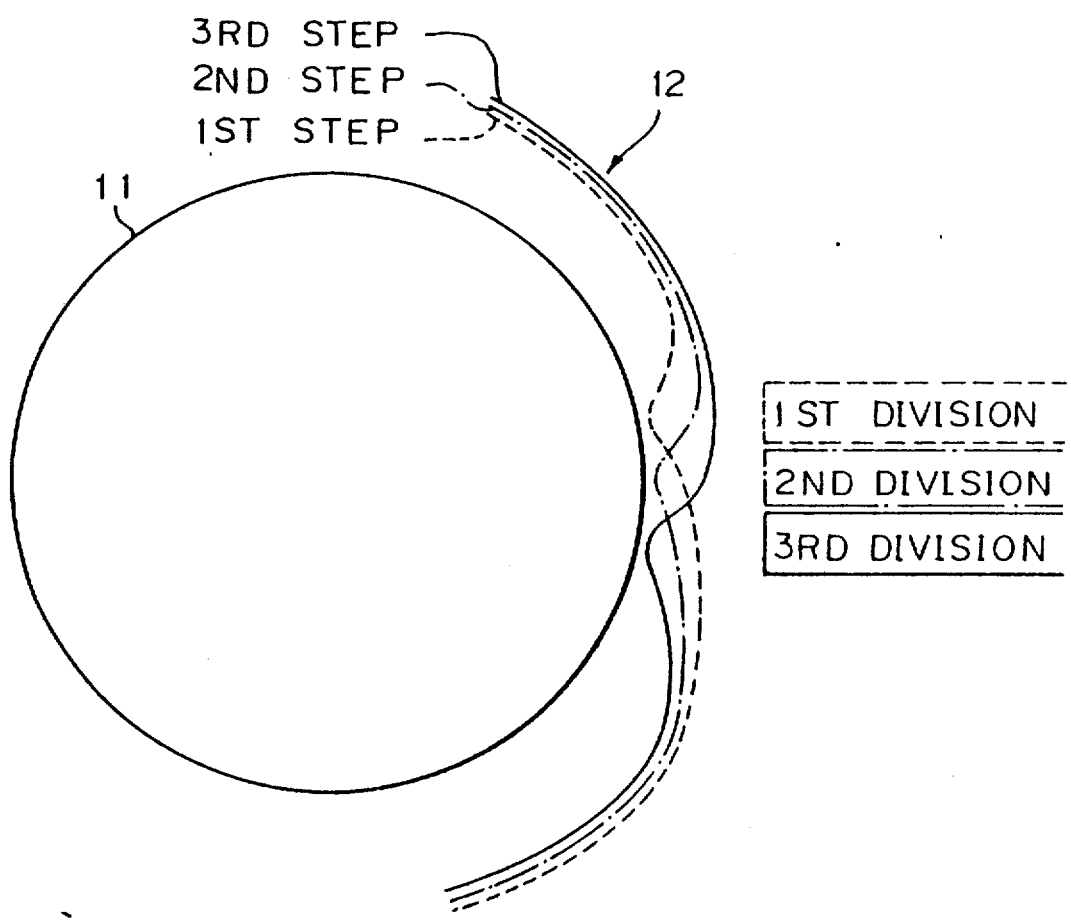
Figure 6:
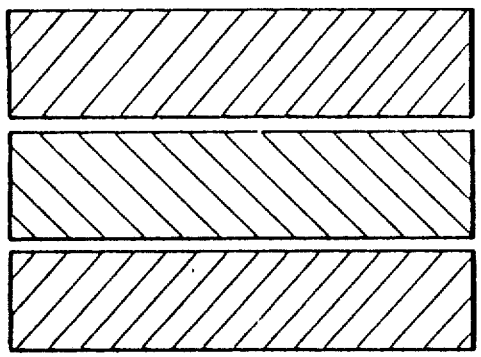
Figure 7:
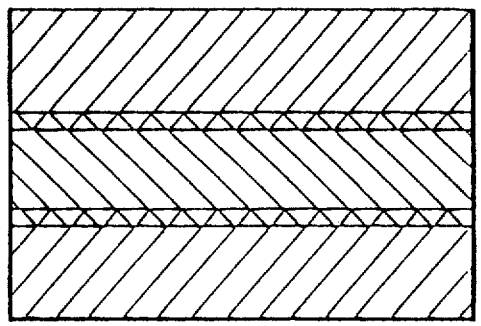

How the paper 12 behaves with respect to the surface of the plate 11 in response to the printing by each of the divisions of the head pins is illustrated in FIG. 4.

Figure 5:
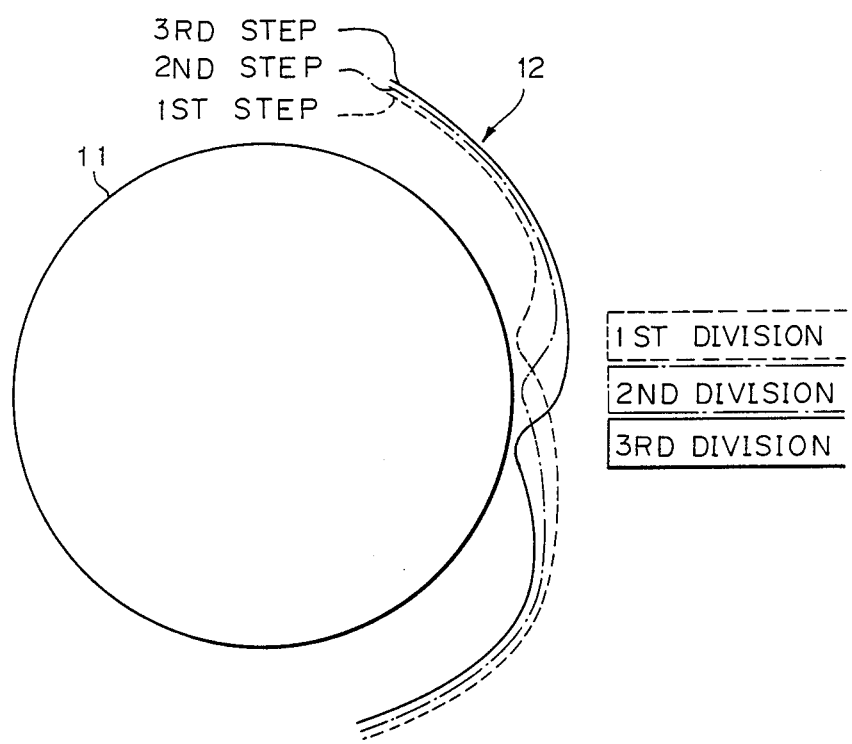
FIG. 5 illustrates the change of the behavior of the paper in the processes shown in FIG. 4.

For better understanding of the shift of position of the paper, the state of the paper in the process of a first step, second step, and third step of the divisional printing is shown exaggerated in FIG. 5.

In FIG. 5, the state of the paper in the first step is expressed in broken line, in the second step in chain line, and in the third step in solid line.

Figure 6:
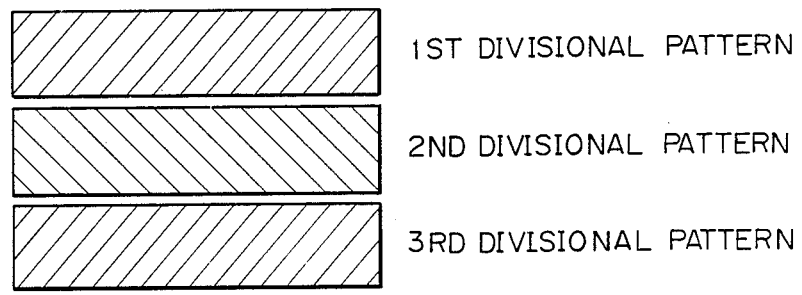
FIGS. 6 and 7 illustrate the problem in the three solid line elements printed by the prior art divisional dot printing device of FIG. 1.
Figure 7:
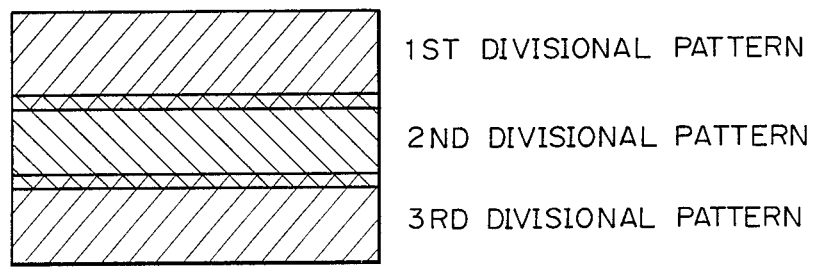

When a broad solid line is printed by divisional printing by the device of FIG. 2, the pattern printed by the device of FIG. 2 will become either the pattern of FIG. 6 or the pattern of FIG. 7, because of the shift of position of the paper illustrated in FIGS. 4 and 5. In FIG. 6, a gap is formed between the adjacent divisional patterns. In FIG. 7, an overlapped region is formed between the adjacent divisional patterns.

Figure 8B:
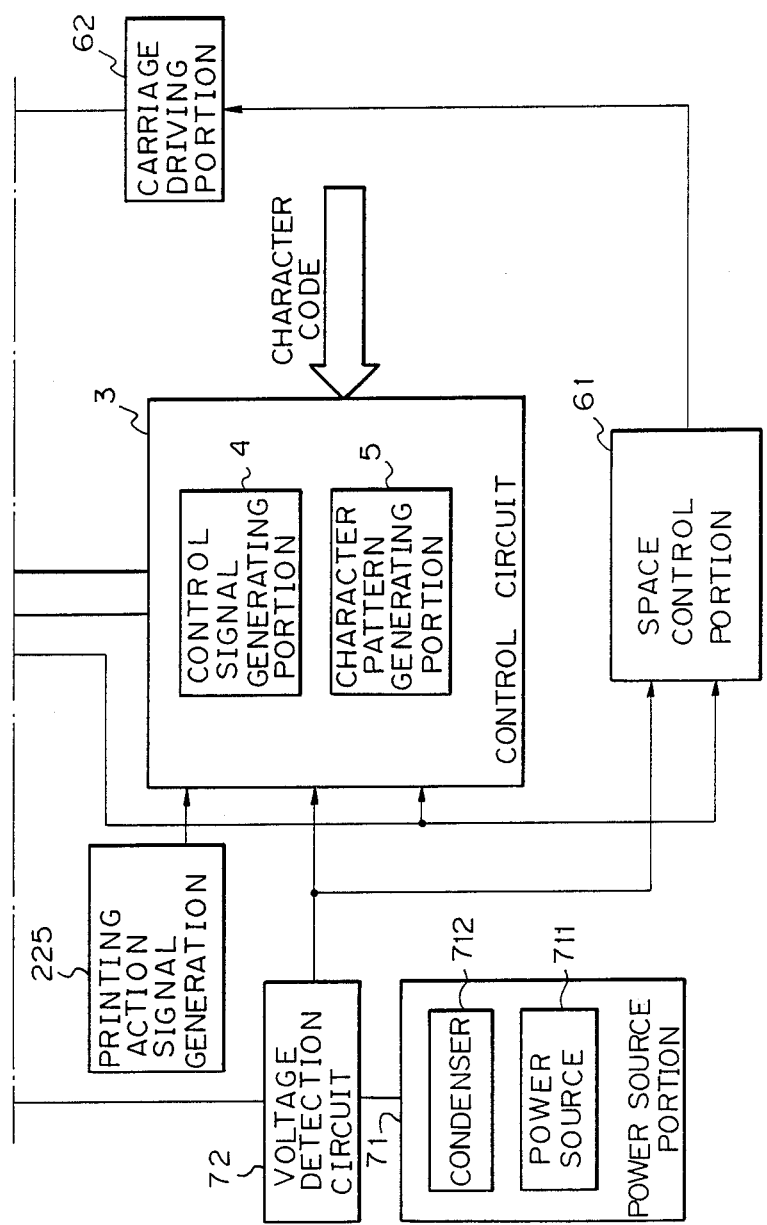

A device for distributive dot printing for a printer according to an embodiment of the present invention is shown in FIG. 8. The device of FIG. 8 includes a platen 11, a paper 12 to be printed, a carriage 21 for a printing head, a printing head 22, a control circuit 3 having a control signal generating portion 4, and a character/graphic pattern generating portion 5. The device of FIG. 8 also includes a space controlling portion 61, a carriage driving portion 62, a power source portion 71 having a power source 711 and a capacitor 712, and a voltage detection circuit 72. The printing head 22 is provided with a temperature detection element 226. The printing operation signal is delivered from a printing operation signal generating portion 225.

The character/graphic pattern generating portion 5 generates character patterns to be supplied to the control signal generating portion 4 on the basis of the character code supplied to the control circuit 3.

The structure of the control circuit 3 in the device of FIG. 8 is shown in FIG. 9. The control signal generating portion 4 in the control circuit 3 includes a shift register 41, a transfer clock signal generating portion 42, a latch circuit 43, a latch pulse generating portion 44, a counter 45 an OR gate 451, an inverter 452, a decoder 46, AND gates 47-1, 47-2, ... 47-24, transistors 222-1, 222-2, ... 222-24, and pin driving excitation coils 221-2, 221-2, ... 221-24.

The shift register 41 is an N step shift register. In this example, N=24. The shift register 41 receives the signal from the character/graphic pattern generating portion 5 and the signal from the transfer clock signal generating portion 42. The latch circuit 43 has the same number of steps as the shift register 41. The latch circuit 43 receives the signal from the latch pulse generating portion 44.

The outputs of the latch circuit 43 are supplied to input terminals of the AND gates 47-1, 47-2, ... 47-24.

The outputs of the decoder 46 are supplied to other input terminals of the AND gates 47-1, 47-2, ... 47-24.

The output of the AND gate 47-1 is supplied to the base of the transistor 223-1. The output of the transistor 222-1 is supplied to the head pin (dot wire) driving excitation coil 221-1. The pin driving excitation coil 221-2 drives the head pin 221-1.

The first output line 461 from the decoder 46 is connected to input terminals of the 1st, 4th, 7th, ... and 22nd AND gates; 47-1, 47-4, 47-7, ... 47-22. The second output line 462 from the decoder 46 is connected to input terminals of the 2nd, 5th, 8th, ... and the 23rd AND gates; 47-2, 47-5, 47-8, ... 47-23. The third output line 463 from the decoder 46 is connected to input terminals of the 3rd, 6th, 9th, ... and 24th AND gates; 47-3, 47-6, 47-9, ... 47-24.

The decoder 46 receives the signal from the counter 45. The output signals of the decoder 46 delivered through the output lines 461, 462, and 463 is regarded as an ENABLE signal. An ENABLE signal "1, 1, 1" is delivered when the output of the counter 45 is "0". An ENABLE signal "1, 0,0" is delivered when the output of the counter 45 is "1". An ENABLE signal "0, 1, 0" is delivered when the output of the counter 45 is "2". An ENABLE signal "0, 0, 1" is delivered when the output of the counter 45 is "3".

When the character or picture data can be handled by 33% of less of the 100% power source capacity, the output of the counter 45 is "0".

When the picture data, such as picture data for a graphic matter, requires more than 33% of the 100% power source capacity, the counter 45 delivers, outputs "1", "2", and "3" successively.

When the ENABLE signal on the output line 461 is "1", the 1st, 4th, 7th, ... 22nd head pin ("3n−2" head pin) are actuated.

When the ENABLE signal on the output line 462 is "1", the 2nd, 5th, 8th, ... 23rd head pin ("3n−1" head pin) are actuated.

When the ENABLE signal on the output line 463 is "1", the 3rd, 6th, 9th, ... 24th head pin ("3n" head pin) are actuated.

Thus, in accordance with the sequence of ENABLE signals "1, 0, 0", "0, 1, 0", and "0, 0, 1" on the output lines 461, 462, and 463, distributive actuations of all the head pins 221-1, 221-2, 221-3, ... 221-24 are carried out so that the actuation of one row of head pins is completed.

A pattern of dots printed according to the distributive printing by the device of FIG. 8 is illustrated in FIG. 10. In the first distributive step of printing, the dots by the 1st, 4th, 7th, ... 22nd head pins are printed. In the second distributive step of printing, the dots by the 2nd, 5th, 8th, ... 23rd head pins are printed. In the third distributive step of printing, the dots by the 3rd, 6th, 9th, ... 24th head pins are printed. In FIG. 10, dots printed in the distributive step in question are indicated by black circles, while dots printed in the preceding distributive step or steps, are indicated by white circles.

The clock input terminal CL of the counter 45 receives the signal of the printing action. The gate input terminal G of the counter 45 receives the output of the OR gate 451. The reset input terminal RS of the counter 45 receives the output of the inverter 452 which receives the output of the OR gate 451.

One input terminal of the OR gate 451 receives the voltage detection signal from the voltage detection circuit 72. The other input terminal of the OR gate 451 receives the temperature detection signal from the temperture detection element 226.

The output of the voltage detection circuit 72 and the output of the temperature detection element 226 are also supplied to the space control portion 61.

Figure 11A:
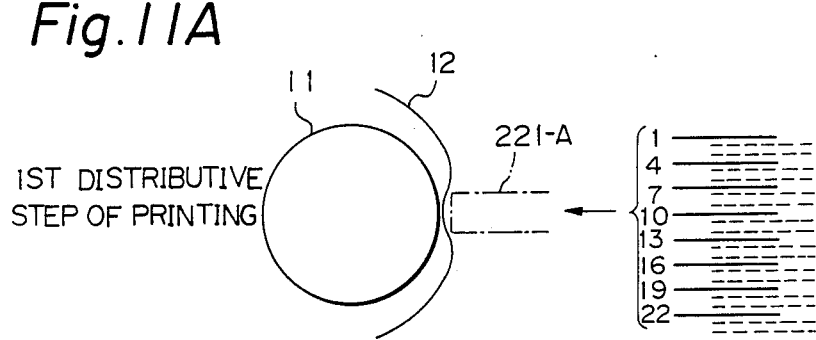
FIGS. 11A, 11B and 11C show the motions of the head pins in the operation of the device of FIG. 8.
Figure 11B:
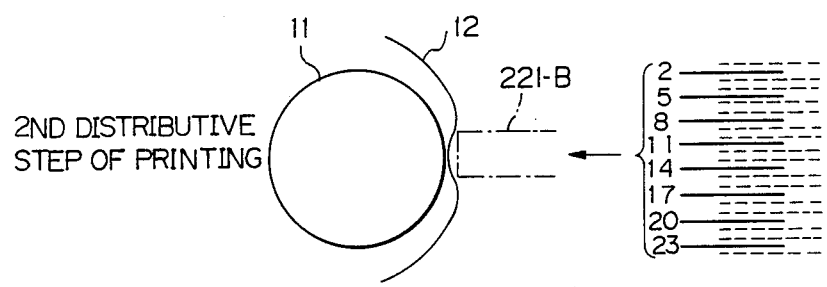
Figure 11C:
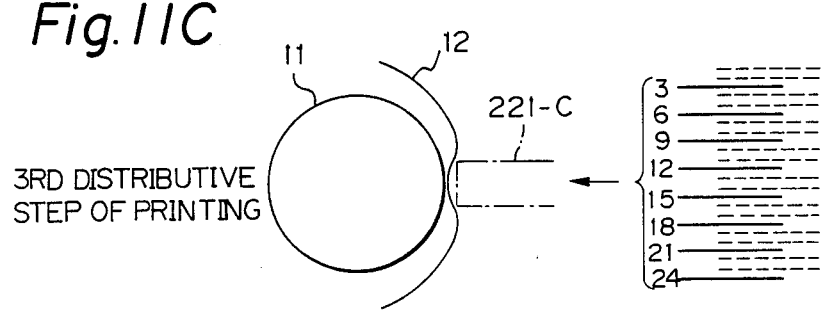
Figure 1:
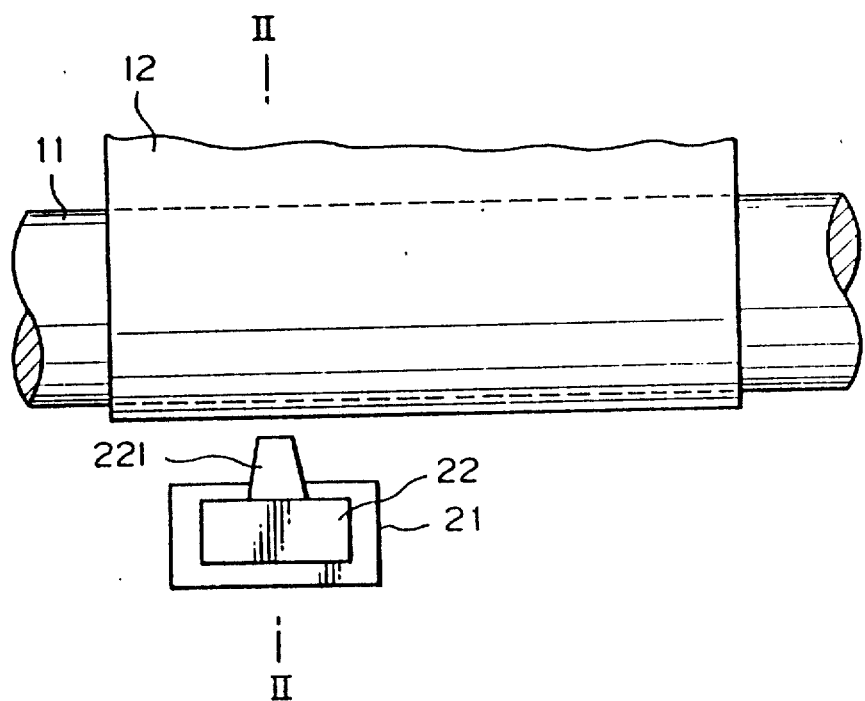

In the distributive printing by the device of FIG. 8, the three steps of the distributive printing are carried out as illustrated in FIGS. 11A, 11B, and 11C. In each of the three steps of distributive printing, printing by eight head pins is applied across the same vertical length of the paper 12 at almost the same position. No substantial shift of position of the paper 2 will occur during these three steps. Thus, gaps and overlapping as shown in FIGS. 6 and 7 of the prior art are prevented, so that satisfactory printing of a pattern of a broad solid line is achieved.

Various modifications can be possible without departing from the scope of the present invention. The number of steps of the distributive printing can be selected as other than three. However, two or three is considered as the most suitable number of the steps. The manner of distribution of head pins in each of the distributive printing steps can be an irregular manner, instead of the above-described manner where one pin out of three is regularly selected.

What is claimed is:

1. A device for distributive dot printing for a printer comprising:

printing head means having a plurality of head pins arranged in a vertical direction, said plurality of head pins being divided into a plurality of step divisions;

print medium means on which printing by said printing head means is carried out;

carriage means carrying said printing head means for transporting said printing head means in a horizontal direction;

carriage transportation control means for causing said printing head means to carry out a plurality of printing actions for each row of said head pins; and head pin selection means for selecting predetermined head pins in said plurality of step divisions, said head pins being equally vertically spaced apart in each said step division across an entire row of said head pins in each printing action to cause said printing head means to carry out distributive dot printing per each printing action, different pins located with a same interval in each step division as selected, supplemental printing of dots being carried out in a space between the dots printed in the preceding printing action.

2. A device according to claim 1, further comprising voltage detection means for detecing the voltage of a power source for driving head pins of said printing head means.

3. A device according to claim 2, further comprising voltage signal generating means for generating signals for instructing a plurality of printing actions to said carriage transportation control means and instructing selection of pins to said head pin selection means, when the voltage of a power source for driving head pins of said printing head means falls below a predetermined voltage.

4. A device according to claim 1, further comprising temperature detection means for detecting the temperature of said printing head means.

5. A device according to claim 4, further comprising temperature signal generating means for generating signals for instructing a plurality of printing actions to said carriage transportation control means and instructing selection of pins to said head pin selection means, when the temperature of said printing head means exceeds a predetermined temperature.

* * * * *

UNITED STATES PATENT AND TRADEMARK OFFICE
CERTIFICATE OF CORRECTION

PATENT NO. : 4,743,127

DATED : May 10, 1988

INVENTOR(S) : UEMATSU

Figure 1:
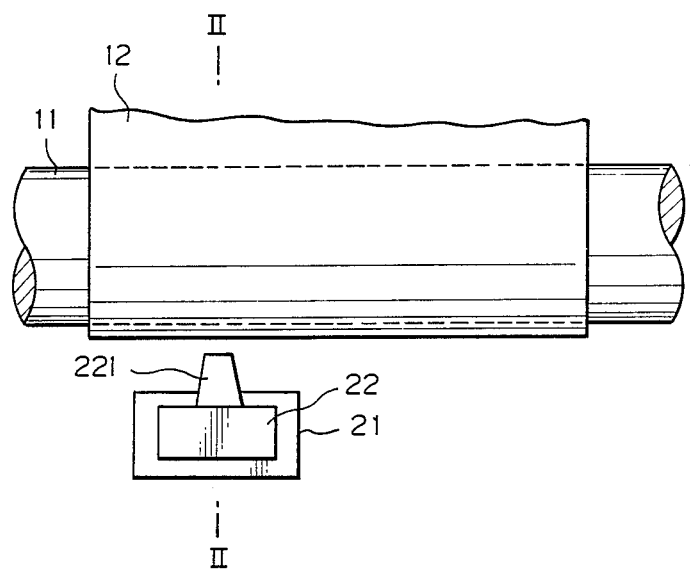
FIG. 1 is a general view of a prior art divisional dot printing device.

It is certified that error appears in the above-identified patent and that said Letters Patent is hereby corrected as shown below:

On the drawing sheet 1 of 12, delete Figure 1 and insert new Figure 1, as shown on the attached page.

On the drawing sheet 2 of 12, delete Figure 2 and insert new Figure 2, as shown on the attached page.

On the drawing sheet 3 of 12, delete Figure 3 and insert new Figure 3, as shown on the attached page.

On the drawing sheet 4 of 12, delete Figure 4 and insert new Figure 4, as shown on the attached page.

On the drawing sheet 5 of 12, delete Figure 5 and insert new Figure 5, as shown on the attached page.

On the drawing sheet 6 of 12, delete Figure 6 and Figure 7 and insert new Figures 6 and 7, as shown on the attached page.

Signed and Sealed this

Twenty-first Day of February, 1989

Attest:

DONALD J. QUIGG

Attesting Officer

Commissioner of Patents and Trademarks

Fig. 3 PRIOR ART

| 1ST STEP OF DIVISIONAL PRINTING | 2ND STEP OF DIVISIONAL PRINTING | 3RD STEP OF DIVISIONAL PRINTING |
|---|---|---|
| 1 ● ● ● ● ● --- | 1 ○ ○ ○ ○ ○ --- | 1 ○ ○ ○ ○ ○ --- |
| 2 ● ● ● ● ● | 2 ○ ○ ○ ○ ○ | 2 ○ ○ ○ ○ ○ |
| 3 ● ● ● ● ● | 3 ○ ○ ○ ○ ○ | 3 ○ ○ ○ ○ ○ |
| 4 ● ● ● ● ● | 4 ○ ○ ○ ○ ○ | 4 ○ ○ ○ ○ ○ |
| 5 ● ● ● ● ● | 5 ○ ○ ○ ○ ○ | 5 ○ ○ ○ ○ ○ |
| 6 ● ● ● ● ● | 6 ○ ○ ○ ○ ○ | 6 ○ ○ ○ ○ ○ |
| 7 ● ● ● ● ● | 7 ○ ○ ○ ○ ○ | 7 ○ ○ ○ ○ ○ |
| 8 ● ● ● ● ● | 8 ○ ○ ○ ○ ○ | 8 ○ ○ ○ ○ ○ |
| 9 | 9 ● ● ● ● ● --- | 9 ○ ○ ○ ○ ○ --- |
| 10 | 10 ● ● ● ● ● | 10 ○ ○ ○ ○ ○ |
| 11 | 11 ● ● ● ● ● | 11 ○ ○ ○ ○ ○ |
| 12 | 12 ● ● ● ● ● | 12 ○ ○ ○ ○ ○ |
| 13 | 13 ● ● ● ● ● | 13 ○ ○ ○ ○ ○ |
| 14 | 14 ● ● ● ● ● | 14 ○ ○ ○ ○ ○ |
| 15 | 15 ● ● ● ● ● | 15 ○ ○ ○ ○ ○ |
| 16 | 16 ● ● ● ● ● | 16 ○ ○ ○ ○ ○ |
| 17 | 17 | 17 ● ● ● ● ● --- |
| 18 | 18 | 18 ● ● ● ● ● |
| 19 | 19 | 19 ● ● ● ● ● |
| 20 | 20 | 20 ● ● ● ● ● |
| 21 | 21 | 21 ● ● ● ● ● |
| 22 | 22 | 22 ● ● ● ● ● |
| 23 | 23 | 23 ● ● ● ● ● |
| 24 | 24 | 24 ● ● ● ● ● |

- 1ST DIVISIONAL PATTERN
- 2ND DIVISIONAL PATTERN
- 3RD DIVISIONAL PATTERN

- 1ST DIVISIONAL PATTERN
- 2ND DIVISIONAL PATTERN
- 3RD DIVISIONAL PATTERN